US008751192B2

(12) United States Patent
Schulz et al.

(10) Patent No.: US 8,751,192 B2
(45) Date of Patent: Jun. 10, 2014

(54) METHODS AND SYSTEMS FOR ASSESSING VEHICLE TRANSMISSIONS

(75) Inventors: Steven E. Schulz, Torrance, CA (US); Bon Ho Bae, Torrance, CA (US); Silva Hiti, Redondo Beach, CA (US); Min Dai, Torrance, CA (US); Harry J. Bauer, Troy, MI (US); Samuel J. Harbin, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 620 days.

(21) Appl. No.: 12/862,377

(22) Filed: Aug. 24, 2010

(65) Prior Publication Data

US 2012/0053881 A1     Mar. 1, 2012

(51) Int. Cl.
*G01M 17/00*     (2006.01)
*F16H 61/12*     (2010.01)
*G01M 13/02*     (2006.01)
*G01M 17/007*    (2006.01)
*F16H 61/00*     (2006.01)

(52) U.S. Cl.
CPC .............. *F16H 61/12* (2013.01); *G01M 13/02* (2013.01); *G01M 17/007* (2013.01); *F16H 2061/0068* (2013.01)
USPC ............. 702/151; 310/216.001; 310/216.112; 318/139; 702/113

(58) Field of Classification Search
CPC ............ F16H 61/12; F16H 2061/1284; F16H 2061/0068; G01M 13/02; G01M 17/007; B60Y 2304/09; B60K 6/26; B60K 6/365; B60K 6/445; B60K 6/547; H02K 24/00; H02K 11/00; H02K 29/12
USPC ................... 702/77, 79, 113, 145, 149, 151; 318/139, 400.23; 324/207.25; 701/37, 701/54; 310/216.001, 216.112
See application file for complete search history.

(56) References Cited

U.S. PATENT DOCUMENTS

| 4,962,331 | A | * | 10/1990 | Smith | 310/216.001 |
| 6,137,204 | A | * | 10/2000 | Kuwahara | 310/216.112 |
| 2001/0004721 | A1 | * | 6/2001 | Bosse | 701/54 |
| 2008/0272717 | A1 | * | 11/2008 | Gleason et al. | 318/139 |
| 2009/0115408 | A1 | | 5/2009 | West et al. | |
| 2010/0244755 | A1 | * | 9/2010 | Kinugasa et al. | 318/400.23 |

FOREIGN PATENT DOCUMENTS

CN     100590388 C     2/2010

OTHER PUBLICATIONS

Hwang, S. H., et al. "Compensation of Amplitude Imbalance and Imperfect Quadrature in Resolver Signals for PMSM Drives," IEEE Energy Conversion Congress and Exposition, Sep. 2009, pp. 1720-1725.
Kwon, Y-H., et al. "Compensation of Amplitude Imbalance of Resolver Signal for PMSM Drives," IEEE Power Electronics and Motion Control Conference, May 2009, pp. 1827-1831.
State Intellectual Property Office of the People's Republic of China, Office Action mailed Oct. 15, 2013 for Chinese Patent Application No. 201110246311.2.

* cited by examiner

*Primary Examiner* — John H Le
(74) *Attorney, Agent, or Firm* — Ingrassia Fisher & Lorenz, P.C.

(57) ABSTRACT

Methods and systems are provided for assessing a vehicle transmission having a resolver. A memory is configured to store preliminary data pertaining to an error of the resolver. A processor is coupled to the memory, and is configured to determine a harmonic characteristic of the preliminary data, and to assess the vehicle transmission using the harmonic characteristic.

17 Claims, 4 Drawing Sheets

METHODS AND SYSTEMS FOR ASSESSING VEHICLE TRANSMISSIONS

TECHNICAL FIELD

The present invention generally relates to the field of vehicles and, more specifically, to methods and systems for assessing transmissions of hybrid and/or electric vehicles.

BACKGROUND OF THE INVENTION

Many vehicle transmissions use resolvers to measure a position and speed of a rotor of an electric motor within the transmission. For example, a resolver may be utilized to measure the position and speed of the transmission rotor during operation of the vehicle. However, the resolver may exhibit errors, such as a direct current error (which is also referred to in the field as an offset error) and/or an alternating current error (which is also referred to in the field as a wobble error).

Accordingly, it is desirable to provide methods and systems to assess a vehicle transmission using resolver error data, for example during manufacture of the transmission. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method for assessing a vehicle transmission having a resolver is provided. The method comprises the steps of obtaining preliminary data pertaining to an error of the resolver, determining a harmonic characteristic of the preliminary data, and assessing the vehicle transmission using the harmonic characteristic.

In accordance with another exemplary embodiment, a method for assessing a vehicle transmission having a resolver and a motor is provided. The method comprises the steps of running the motor at an approximately constant speed for a predetermined amount of time, measuring preliminary data while the motor is running, the preliminary data pertaining to a wobble error of the resolver, performing a Fourier transform of the preliminary data, and assessing the vehicle transmission using the Fourier transform.

In accordance with a further exemplary embodiment, a system for assessing a vehicle transmission having a resolver is provided. The system comprises a memory and a processor. The memory is configured to store preliminary data pertaining to an error of the resolver. The processor is coupled to the memory, and is configured to determine a harmonic characteristic of the preliminary data, and to assess the vehicle transmission using the harmonic characteristic.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
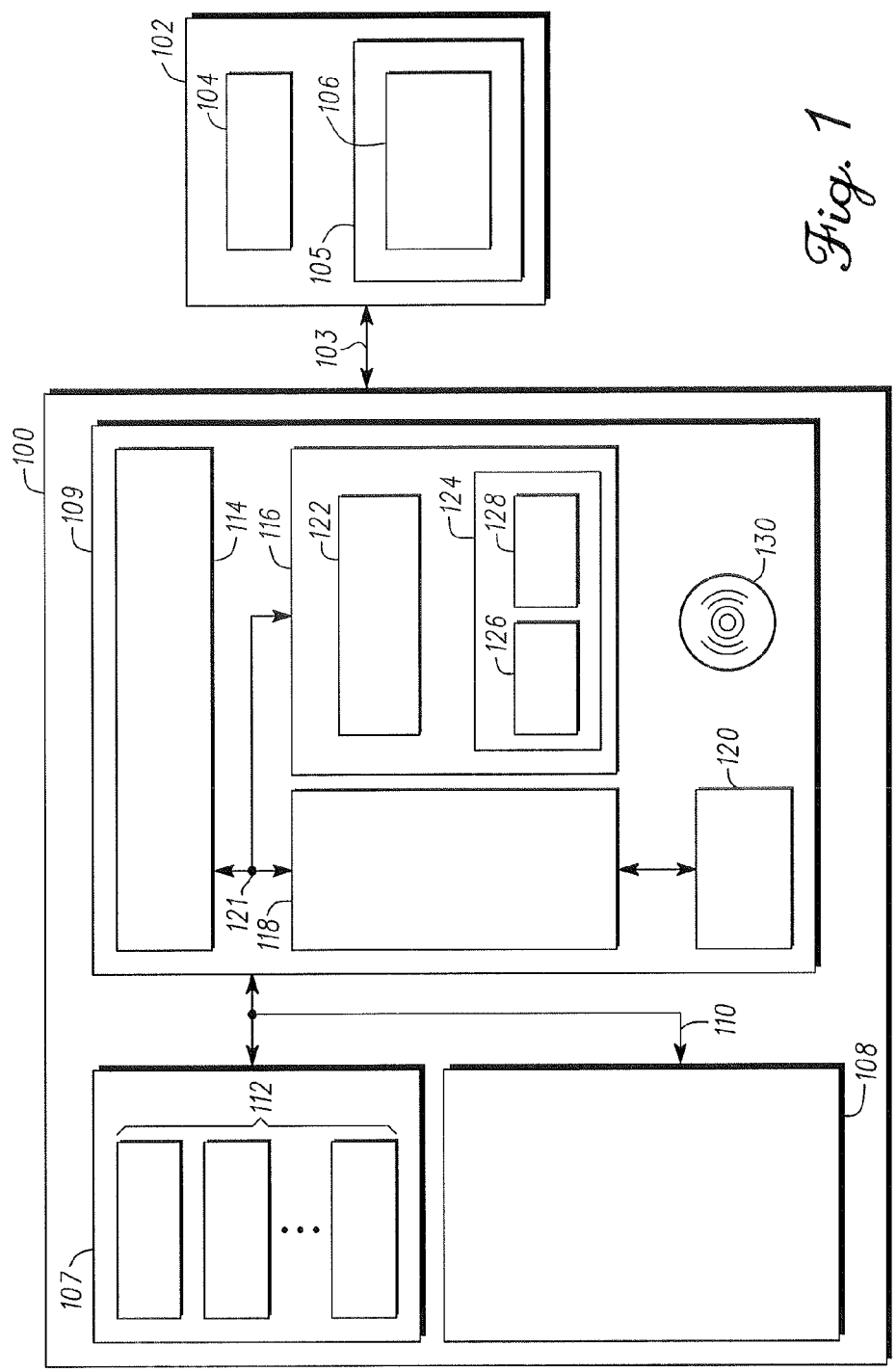
FIG. 1 is a functional block diagram of a system for testing a transmission for a vehicle, depicted along with a transmission under test, in accordance with an exemplary embodiment.

FIG. 1 is a block diagram of an exemplary system 100 for testing a transmission 102 of a vehicle. The transmission 102 preferably represents a transmission under test, for example by a manufacturer of the transmission along an assembly line. The transmission 102 includes a resolver 104 and a motor 105. The motor 105 includes a rotor 106. In one example, the motor 105 comprises a permanent magnet motor. The resolver 104 measures a position of the rotor 106 during operation of the motor 105.

The system 100 is coupled to the transmission 102 via a first communication link 103. In one example, the first communication link 103 comprises a direct-link, wired communication cable. In certain examples, the first communication link 103 may be considered to be part of the system 100.

As depicted in FIG. 1, the system 100 includes measurement devices 107, an inverter 108, a computer system 109, and a second communication link 110. In certain examples, the measurement devices 107 include one or more sensors 112 that are configured to measure values pertaining to the transmission 102, such as back electromotive force (EMF) values. The back EMF measurement may be used, for example, to determine the proper flux linkage of the permanent magnet motor. The back EMF value is a function of the rotor magnets and windings, and defects in either the rotor magnets or windings would likely show up in the back EMF measurement. The test is usually performed at a fixed speed with no pulse width modulation (PWM) switching and measuring the resultant motor voltages. In one example, the resolver wobble characteristics are ascertained simultaneously with the back EMF measurements. In addition, in certain examples, one or more measurement devices 107 are part of the inverter 108. Such other measurement devices may include, by way of example only, position and/or speed sensors, torque sensors, phase current sensors, alternating current (AC) voltage sensors, and direct current (DC) voltage sensors.

The inverter 108 is coupled to the transmission 102, and is preferably coupled to the resolver 104 and the motor 105 thereof. When the transmission 102 is undergoing testing, the inverter 108 runs the motor 105, preferably at a constant speed for a predetermined amount of time. In one example, the inverter 108 runs the motor 105 at a speed of approximately one thousand revolutions per minute for approximately thirty seconds.

The inverter 108 also measures, or assists with measuring, wobble error characteristics pertaining to the resolver 104. The wobble error characteristics are preferably measured via measurement devices, such as via the sensors 112 of the measurement devices 107 and/or other measurement devices of the inverter 108. In one example, the inverter 108 includes a resolver to digital converter (RDC) chip that decodes the resolver signals and provides position and speed information to the processor 114 and/or to a separate microprocessor of the inverter 108. The inverter 108 (and/or other measurement devices 107) and/or other measurement devices preferably measure resolver position and speed that are used in ascertaining wobble error components of the resolver 104. Preliminary data pertaining to the resolver 104 (and including the wobble characteristics) is provided to the computer system 109 along the second communication link 110 for further processing.

The inverter 108 is also preferably coupled to the computer system 109 via the second communication link 110. In addition, in certain embodiments, the inverter 108 and the computer system 109 are each coupled to the measurement devices 107 via the second communication link 110. The second communication link 110 preferably comprises a serial data link.

The computer system 109 preferably controls the operation of the measurement devices 107 and inverter 108. For example, the computer system 109 provides instructions to the inverter 108 that cause the inverter 108 to run the motor 105, instructions for the measurement devices 107 and/or the inverter 108 to measure the wobble characteristics of the resolver 104, and instructions for the inverter 108 to provide the preliminary data to the computer system 109, along with other instructions for controlling the operation of the measurement devices 107 and the inverter 108.

The computer system 109 also processes the preliminary data and generates assessments of the transmission 102 using the processed preliminary data (and the wobble characteristics thereof). Specifically, the computer system 109 performs a Fourier transform on the preliminary data, generates harmonic characteristics of the resolver 104 error therefrom, and generates assessments of the transmission 102 using the harmonic characteristics. The computer system 109 also preferably compares a peak to peak error value of the preliminary data with a first threshold, a first harmonic value of the preliminary data with a second predetermined threshold, a second harmonic value of the preliminary data with a third predetermined threshold. The computer system 109 may also compare higher order harmonic values with additional predetermined thresholds.

In one preferred embodiment, the first predetermined threshold is approximately equal to four degrees, the second predetermined threshold is approximately equal to two degrees, and the third predetermined threshold is approximately equal to one half of a degree. However, the predetermined thresholds may vary. Additional respective predetermined thresholds may be used for higher order harmonic values, if any, that are utilized by the computer system 109.

If each of the harmonic values is less than its respective predetermined threshold, then the transmission 102 is deemed to be acceptable. Conversely, if any of the harmonic values are greater than or equal to their respective predetermined thresholds, then the transmission 102 is deemed to be unacceptable, and remedial action is taken. Such remedial action may include, for example, pulling the transmission from a manufacturing assembly line and conducting further study or analysis of the transmission.

In the depicted embodiment, the computer system 109 includes a processor 114, a memory 116, an interface 118, a storage device 120, and a bus 121. The processor 114 performs the computation and control functions of the computer system 109, and may comprise one processor or multiple processors, single integrated circuits such as a microprocessor, or any suitable number of integrated circuit devices and/or circuit boards working in cooperation to accomplish the functions of a processing unit. During operation, the processor 114 executes one or more programs 122 contained within the memory 116 and, as such, controls the general operation of the computer system 109.

The memory 116 can be any type of suitable memory. This would include the various types of dynamic random access memory (DRAM) such as SDRAM, the various types of static RAM (SRAM), and the various types of non-volatile memory (PROM, EPROM, and flash). The memory 116 stores the above-referenced programs 122 in addition to stored values 124 for use by the processor 114. The stored values 124 preferably include preliminary data 126 (preferably received from the inverter 108, per the discussion above) and predetermined thresholds 128 (such as those described above for use in the harmonic characteristic comparisons for the assessment of the transmission 102). The memory is preferably co-located with the processor 114 on the same chip. The bus 121 serves to transmit programs, data, status and other information or signals between the various components of the computer system 109.

The interface 118 allows communication to the computer system 109, for example from a system driver and/or another computer system, and can be implemented using any suitable method and apparatus. It can include one or more network interfaces to communicate with other systems or components. The interface 118 may also include one or more network interfaces to communicate with technicians, and/or one or more storage interfaces to connect to storage apparatuses, such as the storage device 120.

The storage device 120 can be any suitable type of storage apparatus, including direct access storage devices such as hard disk drives, flash systems, floppy disk drives and optical disk drives. In one exemplary embodiment, the storage device 120 comprises a program product from which memory 116 can receive a program 122 that executes one or more embodiments of one or more processes, such as the process 200 of FIG. 2 (or portions thereof). In another exemplary embodiment, the program product may be directly stored in and/or otherwise accessed by the memory 116 and/or a disk (e.g., disk 130) such as that referenced below.

The bus 121 can be any suitable physical or logical means of connecting computer systems and components. This includes, but is not limited to, direct hard-wired connections, fiber optics, infrared and wireless bus technologies. During operation, the program 122 is stored in the memory 116 and executed by the processor 114.

It will be appreciated that while this exemplary embodiment is described in the context of a fully functioning computer system, those skilled in the art will recognize that the mechanisms are capable of being distributed as a program product in a variety of forms. Examples of signal bearing media include: recordable media such as floppy disks, hard drives, memory cards and optical disks, and transmission media such as digital and analog communication links. It will similarly be appreciated that the computer system 109 may also otherwise differ from the embodiment depicted in FIG. 1, for example in that the computer system 109 may be coupled to or may otherwise utilize one or more remote computer systems and/or other control systems.

Figure 2:
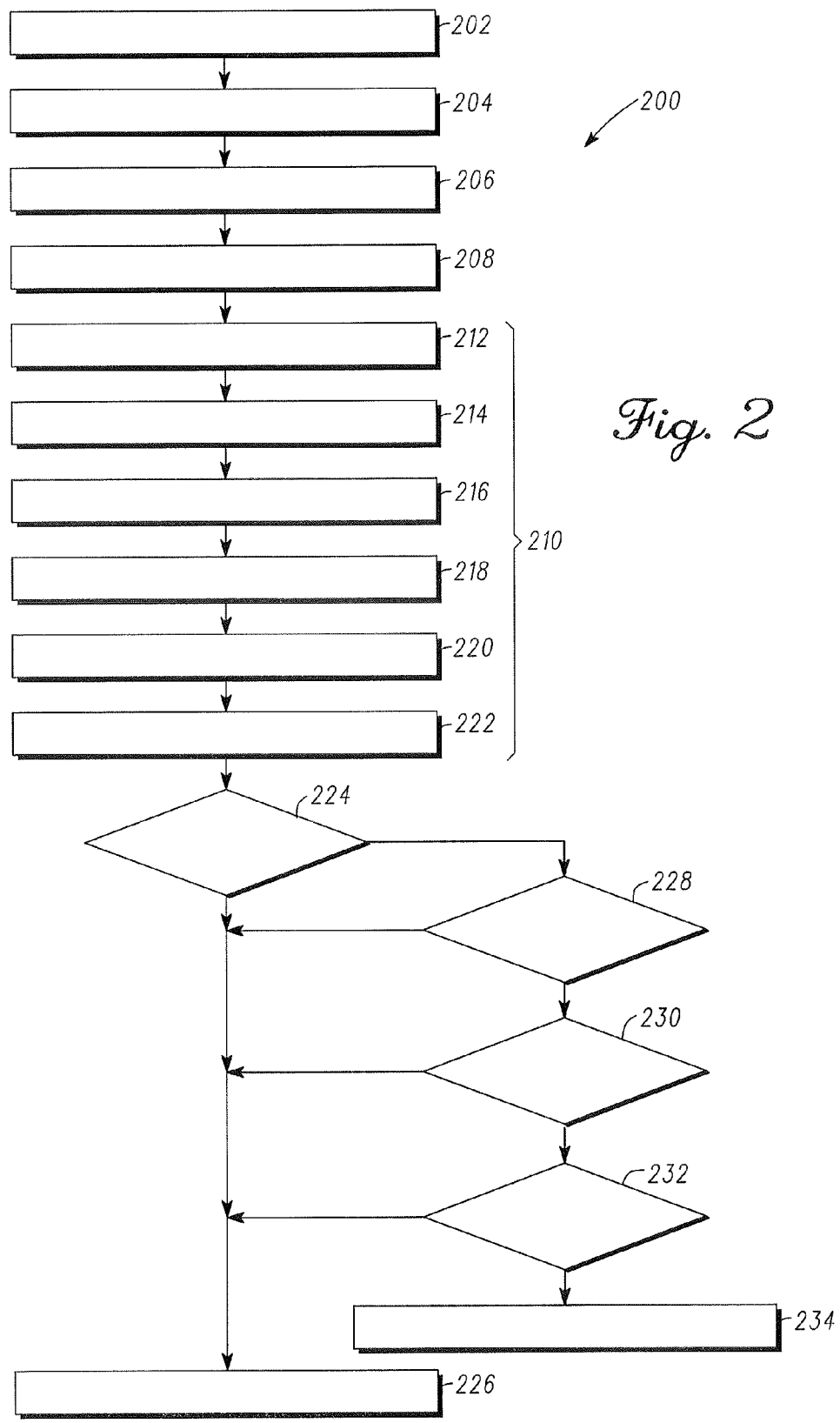
FIG. 2 is a flowchart of a process for testing a transmission of a vehicle, and that can be implemented in connection with the system of FIG. 1, in accordance with an exemplary embodiment.

FIG. 2 is a flowchart of a process 200 for testing a transmission of a vehicle, in accordance with an exemplary embodiment. The process 200 can preferably be implemented in connection with the system 100 and the transmission 102 of FIG. 1.

As depicted in FIG. 2, the process 200 begins with the step of obtaining and/or identifying a transmission under test (step 202). The transmission under test is preferably obtained and identified during an end-of-line test following manufacture of the transmission and before the transmission is installed in a vehicle. For example, the transmission under test may be obtained and identified along an assembly line, for example at a manufacturing plant at which the transmission is produced. The transmission under test preferably corresponds to the transmission 102 of FIG. 1. The transmission under test is preferably identified by the system 100 of FIG. 1, most preferably by the processor 114 of the computer system 109 thereof.

A motor of the transmission under test is run (step 204). The motor preferably corresponds to the motor 105 of FIG. 1. Preferably the motor is run by the inverter 108 of FIG. 1 based on instructions provided to the inverter 108 by the processor 114 of FIG. 1. The motor is preferably run under conditions at which wobble characteristics of a resolver error (preferably corresponding to the resolver 104 of FIG. 1) of the transmission under test may be ascertained. In one preferred example, the motor is run at approximately one thousand revolutions per minute for approximately thirty seconds. However, this may vary.

Preliminary data is obtained pertaining to wobble characteristics of the resolver error (step 206). Preferably the preliminary data is obtained as the motor is running in step 204. In one example, the preliminary data is generated by the inverter 108 using the measurement devices 107 of FIG. 1 (and/or other measurement devices of the inverter 108), for example simultaneously with back EMF measurements obtained while the motor is running. Alternatively, the preliminary data may be generated by the processor 114 of FIG. 1 using raw data. The preliminary data (including the wobble error characteristics) may be generated using any one of a number of different techniques, for example those set forth in the commonly assigned U.S. patent application Ser. No. 12/245,790 entitled "Method and Apparatus to Monitor Position of a Rotatable Shaft" by Stephen T. West and Sean Gleason, filed on Oct. 6, 2008 (U.S. Patent Publication No. 2009/0115408 A1, published on May 7, 2009), incorporated herein by reference.

The preliminary data is then transferred for further processing (step 208). In one example in which the preliminary data is generated by the inverter 108 of FIG. 1, the preliminary data is preferably transferred from the inverter 108 to the computer system 109 via the second communication link 110 and stored in the memory 116 of FIG. 1 as the preliminary data 126 thereof for subsequent use by the processor 114 of FIG. 1. In another example in which the preliminary data is generated by the processor 114 of FIG. 1, the preliminary data is preferably transferred from the processor to the memory 116 of FIG. 1 for storage as the preliminary data 126 for subsequent use by the processor 114.

Transmission characteristics for the transmission under test are determined using the preliminary data (step 210). As depicted in FIG. 2, the transmission characteristics are preferably determined in a combined step 210 via various intermediate steps 212-222. Each of steps 212-222 are described below in turn.

A Fourier transform is performed on the preliminary data (step 212). Preferably a fast Fourier transform is performed using discrete values via a digital signal processing system. In one such example, one hundred twenty eight data points are used for the fast Fourier transform. However, this may vary. The Fourier transform is preferably performed by the processor 114 of FIG. 1 after retrieving the preliminary data 126 of FIG. 1 from the memory 116 of FIG. 1.

In certain examples, a normalization is also performed on the preliminary data (step 214). Specifically, the preliminary data is preferably normalized to a fundamental frequency of the resolver 104 of FIG. 1. The normalization is preferably performed by the processor 114 of FIG. 1. In the depicted example, the normalization is conducted after the Fourier transform. However, in certain other examples, the normalization may be conducted prior to or simultaneously with the Fourier transform. In yet other examples, the normalization may not be necessary.

A peak to peak error value is ascertained for the resolver wobble error (step 216). The peak to peak harmonic value preferably comprises a difference between a maximum resolver wobble error value and a minimum resolver wobble error value of the preliminary data over one cycle of the resolver period. Specifically, the peak to peak harmonic value is preferably ascertained by (i) determining an upper peak value of the resolver wobble error from the preliminary data over one cycle of the resolver period; (ii) determining a lower peak value of the resolver wobble error from the preliminary data over one cycle of the resolver period; and (iii) subtracting the lower peak value from the upper peak value. The lower peak value preferably comprises the smallest resolver wobble error value from the preliminary data over one cycle of the resolver period, and the upper peak value preferably comprises the largest resolver wobble error value from the preliminary data over one cycle of the resolver period. The peak to peak error value is preferably determined by the processor 114 of FIG. 1 based upon the raw error characteristic before the Fourier transform and the normalization, if any, of steps 214-216, are performed.

In addition, a first harmonic value is ascertained for the resolver wobble error (step 218). The first harmonic value is preferably generated from the preliminary data over one cycle of the resolver period. The first harmonic value, as is known in the field, represents a quantification of a significance of a first harmonic characteristic (e.g., a sine wave or a cosine wave) of the preliminary data. The first harmonic value is preferably determined by the processor 114 of FIG. 1 based on the Fourier transform and the normalization, if any, of steps 214-216.

A second harmonic value is ascertained for the resolver wobble error (step 220). The second harmonic value is preferably generated from the preliminary data over one cycle of the resolver period. The second harmonic value, as is known in the field, represents a quantification of a significance of a second harmonic characteristic (e.g., a sine wave or a cosine wave) of the preliminary data. The second harmonic value is preferably determined by the processor 114 of FIG. 1 based on the Fourier transform and the normalization, if any, of steps 214-216.

In certain examples, higher order harmonic values are also ascertained for the resolver wobble error (step 220). For example, a third harmonic value, a fourth harmonic value, and so on, may be generated from the preliminary data over one cycle of the resolver period. Each higher order harmonic value, as is known in the field, represents a quantification of a significance of a particular higher order harmonic characteristic (e.g., a sine wave or a cosine wave) of the preliminary data. The higher order harmonic values are each preferably determined by the processor 114 of FIG. 1 based on the Fourier transform and the normalization, if any, of steps 214-216.

In certain embodiments, the higher order harmonic values may not be necessary. Similarly, in certain embodiments, one or more of the peak to peak value, first harmonic value, and/or second harmonic value may not be necessary. Accordingly, in certain embodiments, one or more of steps 216-222 may be performed without one or more other of steps 216-222.

Various comparisons are conducted and determinations made with respect thereto using the harmonic characteristics of steps 216-222, in order to assess the transmission under test. Specifically, one determination is made as to whether the peak to peak error value of step 216 is less than a first predetermined threshold (step 224). The first predetermined threshold represents a predetermined peak to peak error value such that, a peak to peak error value greater than the first predetermined threshold would indicate a likelihood that there may be a defect or other problem with the transmission under test (such as a defect or problem with the transmission motor, resolver, interface cables, and/or circuitry). In one example, the first predetermined threshold is approximately equal to four degrees. The first predetermined threshold is preferably stored as one of the threshold values 128 of the memory 116 of FIG. 1, and the comparison of step 224 is preferably made by the processor 114 of FIG. 1.

If a determination is made in step 224 that the peak to peak error value is greater than or equal to the first predetermined threshold, then the transmission under test is determined to be potentially defective or unacceptable, and remedial action is preferably taken (step 226). The remedial action may include, by way of example, pulling the transmission from a manufacturing assembly line and conducting further study or analysis of the transmission.

Conversely, if a determination is made in step 224 that the peak to peak error value is less than the first predetermined threshold, then another determination is made as to whether the first harmonic value of step 218 is less than a second predetermined threshold (step 228). The second predetermined threshold represents a predetermined first harmonic value such that, a first harmonic value greater than the second predetermined threshold would indicate a likelihood that there may be a defect or other problem with the transmission under test (such as a defect or problem with the transmission motor, resolver, and/or circuitry). In one example, the second predetermined threshold is approximately equal to two degrees. The second predetermined threshold is preferably stored as one of the threshold values 128 of the memory 116 of FIG. 1, and the comparison of step 228 is preferably made by the processor 114 of FIG. 1.

If a determination is made in step 228 that the first harmonic value is greater than or equal to the second predetermined threshold, then the transmission under test is determined to be potentially defective or unacceptable. The process proceeds to the above-referenced step 226, as remedial action is preferably taken.

Conversely, if a determination is made in step 228 that the first harmonic value is less than the second predetermined threshold, then a determination is made as to whether the second harmonic value of step 220 is less than a third predetermined threshold (step 230). The third predetermined threshold represents a predetermined second harmonic value such that, a second harmonic value greater than the third predetermined threshold would indicate a likelihood that there may be a defect or other problem with the transmission under test (such as a defect or problem with the transmission motor, resolver, and/or circuitry). In one example, the third predetermined threshold is approximately equal to one half of one degree. The third predetermined threshold is preferably stored as one of the threshold values 128 of the memory 116 of FIG. 1, and the comparison of step 230 is preferably made by the processor 114 of FIG. 1.

If a determination is made in step 230 that the second harmonic value is greater than or equal to the third predetermined threshold, then the transmission under test is determined to be potentially defective or unacceptable. The process proceeds to the above-referenced step 226, as remedial action is preferably taken.

Conversely, if a determination is made in step 230 that the second harmonic value is less than the third predetermined threshold, then, in certain examples, comparisons are made as to whether each of the higher order harmonic values of step 222 is less than a respective additional predetermined threshold (step 232). Each additional predetermined threshold represents a predetermined value of a respective higher order harmonic characteristic (for example, a third harmonic, a fourth harmonic, and the like) such that, a value greater than the predetermined threshold for the respective higher order harmonic would indicate a likelihood that there may be a defect or other problem with the transmission under test (such as a defect or problem with the transmission motor, resolver, and/or circuitry. The additional predetermined thresholds are preferably stored as threshold values 128 of the memory 116 of FIG. 1, and the comparisons of step 232 are preferably made by the processor 114 of FIG. 1.

If a determination is made in step 232 that any of the higher order harmonic values are greater than or equal to their respective predetermined thresholds, then the transmission under test is determined to be potentially defective or unacceptable. The process proceeds to the above-referenced step 226, as remedial action is preferably taken. Conversely, if a determination is made in step 232 that each of the higher order harmonic values are less than their respective predetermined thresholds, then the transmission under test is determined to be acceptable (step 234), and no remedial action is taken.

Accordingly, the transmission under test is deemed to be acceptable (step 234) if the transmission under test passes each of the comparison tests of steps 224, 228, 230, and 232. Conversely, if the transmission under test fails any of the comparison tests of steps 224, 228, 230, and 232, the transmission under test is deemed to be unacceptable, and remedial action is taken (step 226).

In certain embodiments, comparisons of the higher order harmonic values may not be necessary. Similarly, in certain embodiments, comparisons of one or more of the peak to peak error value, first harmonic value, and/or second harmonic value may not be necessary. Accordingly, in certain embodiments, one or more of steps 224, 228, 230, and 232 may be performed without one or more other of steps 224, 228, 230, and 232. In such embodiments, the transmission under test is preferably considered to be acceptable (step 234) if it passes each of the comparison tests that are applied. Conversely, the transmission under test is preferably considered to be unacceptable (with remedial action taken) (step 226) if it fails any of the comparison tests that are applied.

Figure 3:
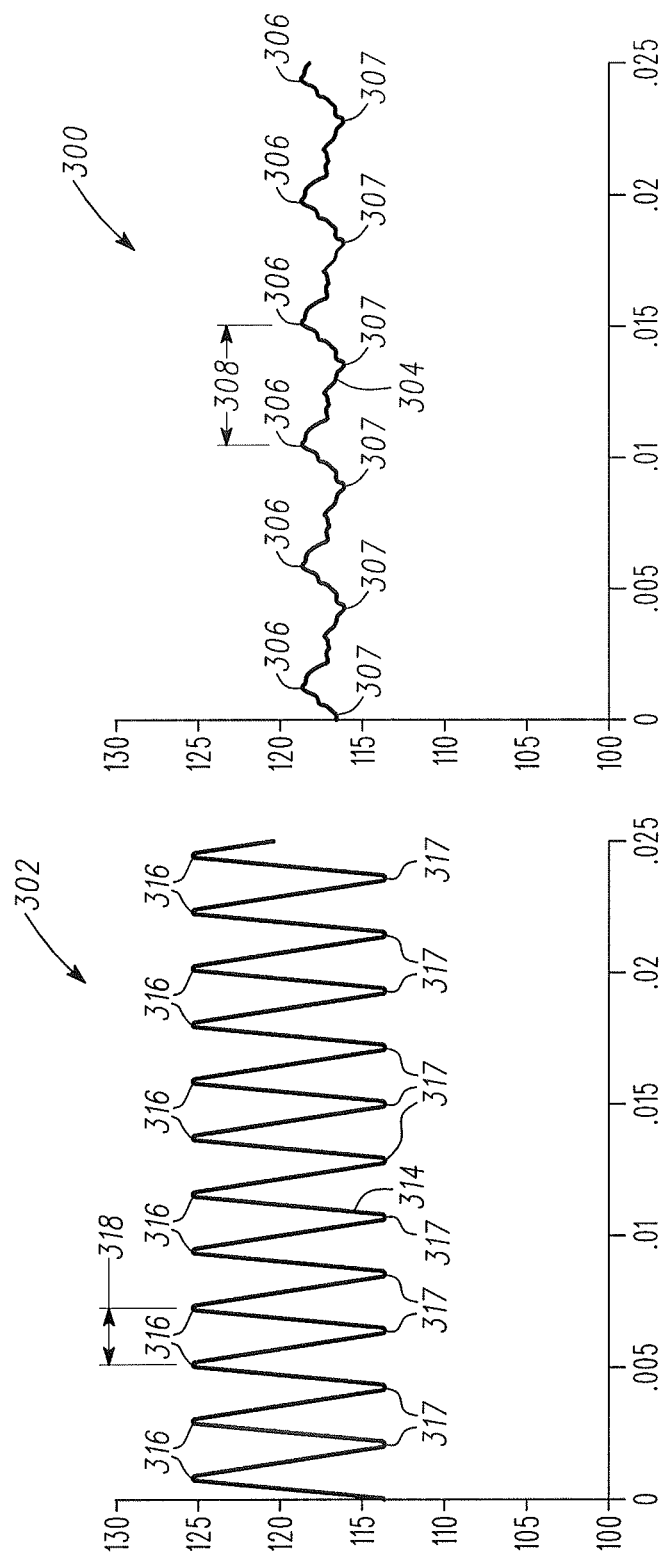
FIGS. 3 and 4 are exemplary graphical representations of simulation data implementing the process of FIG. 2 using the system of FIG. 1, in accordance with an exemplary embodiment.
Figure 4:
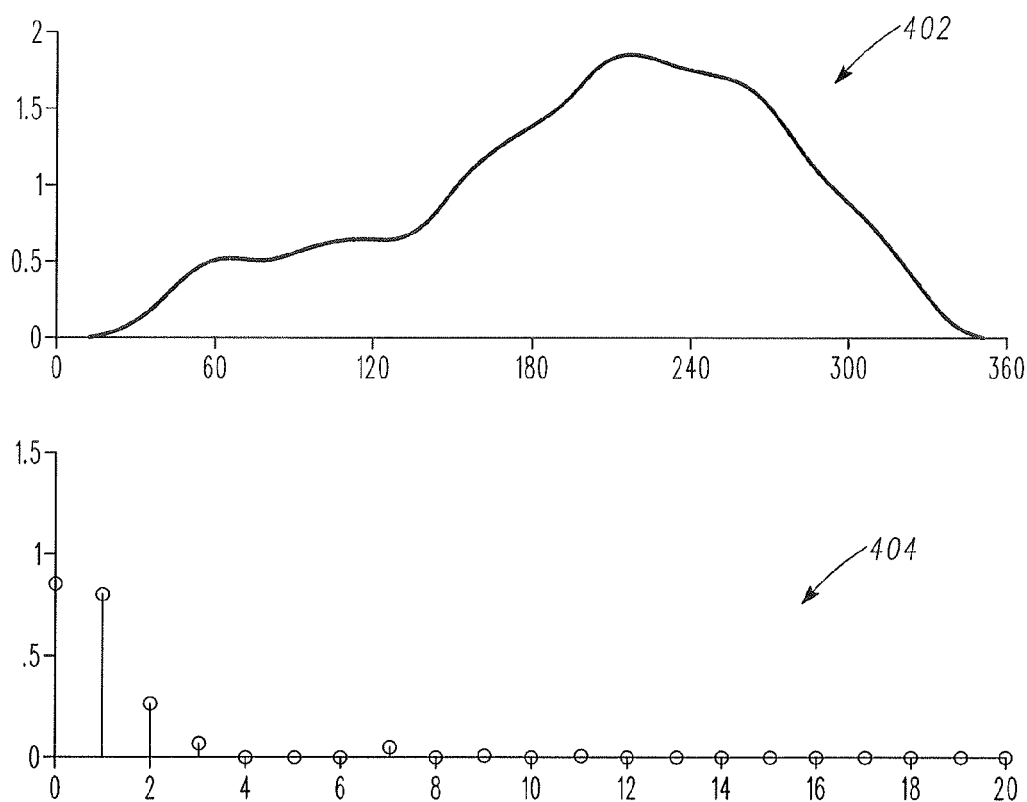

FIGS. 3 and 4 are exemplary graphical representations of simulation data implementing the process 200 of FIG. 2 using the system 100 of FIG. 1, in accordance with an exemplary embodiment. First, FIG. 3 depicts a first graphical representation 300 of simulation data regarding a first exemplary transmission under test and a second graphical representation 302 of simulation data regarding a second exemplary transmission under test, each tested in accordance with the system 100 of FIG. 1 and the process 200 of FIG. 2. In both the first and second graphical representations 300, 302, the horizontal axis corresponds to time (in seconds), and the vertical axis corresponds to measured resolver wobble (in degrees).

The first graphical representation 300 pertains to a first transmission under test that has passed each of the comparison tests of steps 224, 228, 230, and 232 of the process 200 of FIG. 2. The first graphical representation 300 includes a curve 304 of the resolver wobble error over time for this first transmission under test. The curve 304 includes various upper peak values 306 (or maximum values) equal to approximately one hundred nineteen degrees, and various lower peak values 307 (or minimum values) equal to approximately one hundred sixteen degrees. In this example, the peak to peak value of step 216 of the process 200 of FIG. 2 is approximately equal to three degrees (i.e., one hundred nineteen degrees minus one hundred sixteen degrees), and therefore passes the peak to peak value comparison test of step 224 of FIG. 2 in an exemplary embodiment. Also in the first graphical representation 300 of FIG. 3, the resolver wobble error is dominated by a first harmonic value, which can be determined based upon a distance 308 between adjacent upper peak values 306.

The second graphical representation 302 pertains to a second transmission under test that has failed at least one of the comparison tests of steps 224, 228, 230, and 232 of the process 200 of FIG. 2. The second graphical representation 302 includes a curve 314 of the resolver wobble error over time for this second transmission under test. The curve 314 includes various upper peak values 316 (or maximum values) equal to approximately one hundred twenty six degrees, and various lower peak values 317 (or minimum values) equal to approximately one hundred fourteen degrees. In this example, the peak to peak value of step 216 of the process 200 of step 216 of FIG. 2 is approximately equal to twelve degrees (i.e., one hundred twenty six degrees minus one hundred fourteen degrees), and therefore fails the peak to peak value comparison test of step 224 of FIG. 2 in an exemplary embodiment. Also in the second graphical representation 302 of FIG. 3, the resolver wobble error is dominated by a second harmonic value, which can be determined based upon a distance 318 between adjacent upper peak values 316.

FIG. 4 depicts a third graphical representation 402 and a fourth graphical representation 404 of simulation data regarding another transmission under test that is tested in accordance with the system 100 of FIG. 1 and the process 200 of FIG. 2. In the third graphical representation 402, the horizontal axis corresponds to the resolver position angle (in degrees), and the vertical axis corresponds to the measured resolver wobble (in degrees). In the fourth graphical representation 404, the horizontal axis corresponds to the normalized harmonic number, normalized to the resolver period (alternatively stated, the harmonic content with the frequency normalized to the resolver fundamental period), and the vertical axis corresponds to the measured resolver wobble (in degrees).

In the example of FIG. 4, the resolver wobble error for the transmission under test is dominated by a first harmonic value with a period approximately equal to the resolver period. This is shown in the third graphical representation 402 by the fact that the curve of the third graphical representation 402 represents approximately a single sine or cosine curve for the resolver period. This is also shown in the fourth graphical representation 404 by the fact that, of the non-zero harmonic values along the horizontal axis, the first harmonic (i.e., with the harmonic value equal to one) has the largest corresponding resolver wobble value (i.e., approximately, equal to 0.8 degrees). For example, by contrast, the second harmonic value has a corresponding resolver wobble value of approximately 0.3 degrees. Also as shown in FIG. 4, the zero harmonic value for this transmission under test corresponds to approximately 0.9 degrees. The zero harmonic value of FIG. 4 represents a direct current (DC) (or offset error) component of the total resolver error. All of the non-zero harmonic values of FIG. 4 (i.e., with harmonic values of one or greater) represent the wobble portion of the resolver error. However, the methods and systems described above preferably utilize the harmonic characteristics of the resolver wobble error, with the harmonic values being greater than zero.

Accordingly, improved methods and systems are provided for assessing transmissions under test for use in vehicles. The disclosed methods and systems utilize a Fourier transform of resolver wobble error preliminary data, for example as obtained during an end of line test along an assembly line of transmissions for a transmission manufacturer. The Fourier transform (and, in certain examples, an additional normalization step) produce harmonic characteristics of the resolver wobble error preliminary data. Various comparison tests are performed using the harmonic characteristics in order to assess the transmission under test. If the transmission under test passes each of the comparison tests, then the transmission under test is deemed to be acceptable. Conversely, if the transmission under test fails any of the comparison tests, then the transmission under test is deemed to be potentially defective or otherwise unacceptable, and appropriate remedial action is then taken.

It will be appreciated that the disclosed methods and systems may vary from those depicted in the Figures and described herein. For example, various components of the system 100 and/or the transmission 102, and/or components thereof, may vary from those depicted in FIG. 1 and/or described above. Similarly, various steps of the process 200 of FIG. 2 may differ from and/or be performed simultaneously and/or in a different order than depicted in FIG. 2 and/or described above. In addition, the simulation results of FIG. 3 may differ from those depicted and/or described above. It will similarly be appreciated that the disclosed method and systems may be implemented and/or utilized in connection with any number of different types of automobiles, sedans, sport utility vehicles, trucks, and/or any of a number of other different types of vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for assessing a vehicle transmission having a resolver, the method comprising the steps of:
   obtaining preliminary data pertaining to an error of the resolver;
   determining a harmonic characteristic of the error using the data, wherein the step of determining the harmonic characteristic comprises the step of calculating a first harmonic value of the error from the preliminary data; and
   assessing the vehicle transmission using the harmonic characteristic of the error using a processor, wherein the step of assessing the vehicle transmission comprises the steps of:
      determining that the vehicle transmission is acceptable if the first harmonic value of the error is less than a predetermined value; and
      determining that the vehicle transmission is unacceptable if the first harmonic value of the error is not less than the predetermined value.

2. The method of claim 1, wherein:
   the step of obtaining the preliminary data comprises the step of obtaining the preliminary data pertaining to a wobble error of the resolver;

the step of determining the harmonic characteristic of the error comprises determining the harmonic characteristic of the wobble error; and the step of assessing the vehicle transmission comprises assessing whether the vehicle transmission is acceptable using the harmonic characteristic of the wobble error.

3. The method of claim 1, wherein:

the step of determining the harmonic characteristic of the error comprises the steps of:
- performing a Fourier transform of the preliminary data, generating transformed data; and
- determining the harmonic characteristic of the error using the transformed data; and the step of assessing the vehicle transmission comprises assessing whether the vehicle transmission is acceptable using the harmonic characteristic of the error that was determined using the transformed data.

4. The method of claim 3, wherein:

the step of determining the harmonic characteristic further comprises the steps of:
- normalizing the preliminary data, generating normalized data; and
- determining the harmonic characteristic of the error using the normalized data; and the step of assessing the vehicle transmission comprises assessing whether the vehicle transmission is acceptable using the harmonic characteristic of the error that was determined using the normalized data.

5. The method of claim 1, wherein:

the step of determining the harmonic characteristic comprises the step of calculating a second harmonic value of the error from the preliminary data; and the step of assessing the vehicle transmission comprises the steps of:
- determining that the vehicle transmission is acceptable if the second harmonic value of the error is less than a predetermined value; and
- determining that the vehicle transmission is unacceptable if the second harmonic value of the error is not less than the predetermined value.

6. The method of claim 1, wherein:

the step of determining the harmonic characteristic comprises the steps of:
- determining an upper peak value for the error from the preliminary data; and
- determining a lower peak value for the error from the preliminary data; and the step of assessing the vehicle transmission comprises the steps of:
- determining that the vehicle transmission is acceptable if a difference between the upper peak and the lower peak values for the error is less than a predetermined value; and
- determining that the vehicle transmission is unacceptable if the difference between the upper peak and the lower peak values for the error is not less than the predetermined value.

7. A method for assessing a vehicle transmission having a resolver and a motor, the method comprising the steps of:
- running the motor at an approximately constant speed for a predetermined amount of time;
- measuring preliminary data while the motor is running, the preliminary data pertaining to a wobble error of the resolver;
- performing a Fourier transform of the preliminary data pertaining to the wobble error, generating transformed data;
- normalizing the preliminary data, generating normalized data; and
- assessing the vehicle transmission using the transformed data generated via the Fourier transform, wherein the step of assessing the vehicle transmission comprises assessing whether the vehicle transmission is acceptable using the normalized data.

8. The method of claim 7, wherein the step of assessing the vehicle transmission comprises the steps of:
- identifying a first harmonic value of the wobble error using the Fourier transform;
- determining that the vehicle transmission is acceptable if the first harmonic value of the wobble error is less than a predetermined value; and
- determining that the vehicle transmission is unacceptable if the first harmonic value of the wobble error is less than the predetermined value.

9. The method of claim 7, wherein the step of assessing the vehicle transmission comprises the steps of:
- identifying a second harmonic value of the wobble error using the Fourier transform;
- determining that the vehicle transmission is acceptable if the second harmonic value of the wobble error is less than a predetermined value; and
- determining that the vehicle transmission is unacceptable if the second harmonic value of the wobble error is not less than the predetermined value.

10. The method of claim 7, wherein the step of assessing the vehicle transmission comprises the steps of:
- determining an upper peak value for the error using the Fourier transform;
- determining a lower peak value for the error using the Fourier transform;
- determining that the vehicle transmission is acceptable if a difference between the upper peak and the lower peak values for the error is less than a predetermined value; and
- determining that the vehicle transmission is unacceptable if the difference between the upper peak and the lower peak values for the error is not less than the predetermined value.

11. A system for assessing a vehicle transmission having a resolver, the system comprising:
- a memory configured to store preliminary data pertaining to an error of the resolver, the memory further configured to store a predetermined value; and
- a processor coupled to the memory and configured to:
  - determine a harmonic characteristic of the error, comprising:
    - determining an upper peak value for the error from the preliminary data;
    - determining a lower peak value for the error from the preliminary data; and
  - assess the vehicle transmission using the harmonic characteristic of the error, comprising:
    - determining that the vehicle transmission is acceptable if a difference between the upper peak and the lower peak values for the error is less than the predetermined value; and
    - determining that the vehicle transmission is unacceptable if a difference between the upper peak and the lower peak values for the error is not less than the predetermined value.

12. The system of claim 11, wherein the vehicle transmission also has a motor, and the system comprises:
- an inverter configured to run the motor at an approximately constant speed for a predetermined amount of time, wherein the processor is configured to measure the preliminary data while the motor is running.

13. The system of claim 12, wherein:
the preliminary data pertains to a wobble error of the resolver;
the harmonic characteristic pertains to the wobble error; and
the processor is configured to assess whether the vehicle transmission is acceptable using the harmonic characteristic of the wobble error.

14. The system of claim 11, wherein the processor is further configured to:
perform a Fourier transform of the preliminary data, generating transformed data;
determine the harmonic characteristic of the error using the transformed data; and
assess whether the vehicle transmission is acceptable using the harmonic characteristic of the error that was determined using the transformed data.

15. The system of claim 14, wherein the processor is further configured to:
normalize the preliminary data, generating normalized data;
determine the harmonic characteristic of the error using the normalized data; and
assess whether the vehicle transmission is acceptable using the harmonic characteristic of the error that was determined using the normalized data.

16. The system of claim 11, wherein:
the memory is further configured to store a predetermined value; and
the processor is further configured to:
determine a first harmonic value of the error from the preliminary data;
determine that the vehicle transmission is acceptable if the first harmonic value of the error is less than the predetermined value; and
determine that the vehicle transmission is unacceptable if the first harmonic value of the error is not less than the predetermined value.

17. The system of claim 11, wherein:
the memory is further configured to store a predetermined value; and
the processor is further configured to:
calculate a second harmonic value of the error from the preliminary data;
determine that the vehicle transmission is acceptable if the second harmonic value of the error is less than the predetermined value; and
determine that the vehicle transmission is unacceptable if the second harmonic value of the error is not less than the predetermined value.

* * * * *